US008230097B2

(12) United States Patent
Rachwalski et al.

(10) Patent No.: US 8,230,097 B2
(45) Date of Patent: Jul. 24, 2012

(54) METHOD AND SYSTEM FOR BROADCASTING MULTIMEDIA DATA (75) Inventors: Jon Rachwalski, Holbrook, NY (US); Daniel Witt, Center Moriches, NY (US)

(73) Assignee: VectorMAX Corporation, Farmingdale, NY (US)

( * ) Notice: Subject to any disclaimer, the term of this patent is extended or adjusted under 35 U.S.C. 154(b) by 741 days.

(21) Appl. No.: 11/244,442

(22) Filed: Oct. 5, 2005

(65) Prior Publication Data

US 2006/0085553 A1 Apr. 20, 2006

Related U.S. Application Data (60) Provisional application No. 60/615,989, filed on Oct. 5, 2004.

(51) Int. Cl.
*G06F 15/16* (2006.01)
*H04L 12/28* (2006.01)
*H04J 3/26* (2006.01)

(52) U.S. Cl. ......... 709/231; 709/227; 370/390; 370/432

(58) Field of Classification Search .......... 709/231, 709/227, 245, 226; 370/352, 390, 392, 401, 370/468, 507, 432, 467; 455/518
See application file for complete search history.

(56) References Cited

U.S. PATENT DOCUMENTS

| 6,006,267 | A  | * | 12/1999 | Nguyen et al. | 709/227 |
| 6,029,200 | A  | * | 2/2000  | Beckerman et al. | 709/226 |
| 6,181,697 | B1 | * | 1/2001  | Nurenberg et al. | 370/390 |
| 6,418,473 | B1 | * | 7/2002  | St. Maurice et al. | 709/231 |
| 6,584,096 | B1 | * | 6/2003  | Allan | 370/352 |
| 6,751,219 | B1 |   | 6/2004  | Lipp et al. | |
| 6,973,081 | B1 | * | 12/2005 | Patel | 370/390 |
| 7,031,326 | B1 | * | 4/2006  | Shur et al. | 370/401 |
| 7,082,142 | B1 | * | 7/2006  | Begeja | 370/507 |
| 7,170,905 | B1 | * | 1/2007  | Baum et al. | 370/467 |

(Continued)

FOREIGN PATENT DOCUMENTS

GB  2 294 132 A  4/1996

(Continued)

OTHER PUBLICATIONS

Bekker et al., "Streaming Media Caching and Replication Techniques", Voice-Over_IP, Jun. 21, 2000, pp. 1-42, SURFnet, Internet: http://alpha.surfnet.nl/vip/vip_d3_1-v110.pdf.

(Continued)

*Primary Examiner* — Aaron Strange
(74) *Attorney, Agent, or Firm* — Jack Schwartz & Associates, PLLC (57) ABSTRACT

A broadcast system provides support for clients to receive transmissions over a unicast or a multicast channel from a broadcast server. A server administrator configures each of a first server and client systems connected to the server to receive data in one of a multicast or unicast transmission mode. An empirical test determines whether an intervening network can support the configured mode and if not, transmission is performed using a fall back mode. The first server is able to provide access to data streams from other servers to the client systems connected thereto. Upon requesting a data stream from another server, the first server receives the data stream, replicates the data stream, transmits the data stream to the requesting client system and stores the replicated data stream for immediate access by any requesting client server connected thereto.

10 Claims, 8 Drawing Sheets

U.S. PATENT DOCUMENTS

| | | | |
|---|---|---|---|
| 2002/0001310 A1* | 1/2002 | Mai et al. | 370/390 |
| 2002/0143951 A1* | 10/2002 | Khan et al. | 709/227 |
| 2002/0188692 A1 | 12/2002 | Horiuchi et al. | |
| 2002/0191612 A1* | 12/2002 | Curtis | 370/392 |
| 2003/0195964 A1 | 10/2003 | Mane | |
| 2004/0003101 A1 | 1/2004 | Roth et al. | |
| 2004/0122975 A1* | 6/2004 | Lennestal et al. | 709/245 |
| 2004/0194143 A1 | 9/2004 | Hirose | |
| 2004/0205338 A1 | 10/2004 | Bertin | |
| 2005/0038326 A1* | 2/2005 | Mathur | 600/300 |
| 2005/0190781 A1* | 9/2005 | Green et al. | 370/432 |
| 2005/0259682 A1* | 11/2005 | Yosef et al. | 370/468 |
| 2005/0272455 A1* | 12/2005 | Oommen | 455/518 |
| 2007/0211720 A1* | 9/2007 | Fuchs et al. | 370/390 |

FOREIGN PATENT DOCUMENTS

WO     WO 03/094449 A1     11/2003

OTHER PUBLICATIONS

Office Action for corresponding Canadian Application No. 2,582,659 dated Jan. 19, 2011.

* cited by examiner

METHOD AND SYSTEM FOR BROADCASTING MULTIMEDIA DATA

CROSS-REFERENCE TO RELATED APPLICATIONS

This is a non-provisional application of U.S. Provisional Application Ser. No. 60/615,989 filed Oct. 5, 2004.

FIELD OF THE INVENTION

The present invention relates generally to multimedia communication, and more specifically, to a system and method for maximizing the reliability and consistency of data being broadcast and insuring the intended receipt thereof.

BACKGROUND OF THE INVENTION

Streaming multimedia systems are able to selectively provide multimedia content over a network in the form of a data stream to at least one client application who requests such multimedia content. The streaming server performs the duties of a file server and makes multimedia data available to client applications by request. Conventionally, a streaming server responds to requests made by client applications by providing a copy of the requested multimedia data stream via the same connection, also known as unicast multimedia transmission. This manner of providing multimedia data streams is bandwidth intensive as the streaming server is required to provide a copy of the multimedia data stream to the respective client applications making the request.

A multicast method of transmission was developed in order to substantially reduce the system resources (i.e. required bandwidth) associated with unicast data stream transmission. Multicast transmission of a data stream is similar to broadcast technology of television programming with the exception that, the multicast data stream is only provided to a predetermined group of users. Thus, instead of receiving a copy of the multimedia stream as in the case of unicast transmission, the users or client applications receive information, representing a location of a specific multicast group. Clients, upon receipt of the information access the requested multimedia by subscribing to the multicast group as specified in the information. This manner of accessing a multimedia data stream substantially reduces the bandwidth required in transmitting the data stream to a plurality of users or client applications.

Therefore, a large business whose streaming system is deployed across a wide and heterogeneous network has strong fiscal incentive to utilize the more bandwidth efficient multicast system. However, such a business may not be able to guarantee that all users client or client applications connected via the network are able to receive a multicast data stream and are only able to access data streams using the unicast transmission method. It is desirable to provide a system whose users can fallback to unicast transmission in the case of multicast reception failure.

Another problem that befalls large business is an increase in the number of users or client applications requesting a respective multimedia data stream that is located on a server at a given time. This increase in requests for multimedia data made by client applications may cause the retrieval capability of the underlying storage device to be exceeded. When this happens, the server load capacity has been exceeded and client requests go unserviced.

Avoiding such bottlenecks is important for a multimedia communication system because the quality of the playback experience of video on demand content is heavily dependent on the guaranteed availability of video data at a rate equal to or greater than the rate of playback. Therefore, once the operative mode of the system is successfully determined and applied, it is desirable to provide a system that reduces streaming server load imbalances so that client demand can be met.

Load imbalancing can be prevented by increasing the number of streaming servers in the system, distributing video on demand content to each of them, and proxying requests from a load balancing server. This occurs when the load balancing server redirects client application requests to one of available streaming servers for request handling. However, there are several drawbacks associated with this scheme. One is the time-consuming and resource consuming task of simultaneously maintaining multimedia content synchronization for all system servers. Additionally, a spike in the number of client requests is difficult to predict, thus making it difficult to adequately plan server deployments to handle the increased client requests ahead of time. Therefore, it is desirable to automate the content synchronization process, to replicate content on a dynamic, as needed basis and to make dynamically replicated content available before being duplicated in its' entirety.

A system according to invention principles address these deficiencies and associated problems.

SUMMARY OF THE INVENTION

A method and system for determining a transport mode according to invention principles is provided. A multicast stream is transmitted by a server to a media player application across an intervening network. If the media player application does not receive the transmitted multicast signal, a unicast transmission mode is enabled. Upon receipt of content in the multicast stream, the media player client checks for features of a multicast streaming format by the media player client. A unicast transmission mode is enabled if the media player application does not detect features of a multicast streaming format. Multicast transmission streaming is enabled upon detecting features of a multicast streaming format by the media player application.

A method and system for replicating an encoded data stream according to invention principles is provided. A first server receives a request for a data stream from at least one client system connected thereto and searches a network of peer servers for the requested data stream. When found, the requested data stream is received from a peer server within the network. The first server then replicates the received data stream and transmits the received data stream to the at least one client. The replicated data stream is then stored in a storage medium of the first server for direct and immediate access by a client system requesting the replicated data stream.

The system insures reliable transmission and receipt of a multimedia datastream by selecting at least one of an available transmission mode and by actively balancing the load of user requests for the multimedia datastream. The system is formed from a transport negotiation mechanism including a server, a player and an intervening network. The server may be configured to support at least one of unicast or multicast transmission mode. The player may also be configured to support at least one of a unicast or multicast transmission mode. The server and player are configured based upon administratively configurable criteria or based upon the intervening network. The system performs an imperical test on the intervening network to determine if the player is able to receive a multicast stream from the server. If the player cannot receive content being transmitted in the multicast stream, a failure is recorded and a fall back to a unicast transmission mode is performed. This criteria allows a streaming server to transmit a data stream in any of the supported transmission modes supported by the intervening network.

The system further provides for replication of a multimedia datastream stored on multimedia streaming servers in response to media player application for the data stream. When the requested data stream is not present on a streaming server to which the request was made, the streaming server initiates a search of peer streaming servers to locate the requested multimedia datastream. Once located, the streaming server on which the requested multimedia datastream is located transmits the datastream to the streaming server which initiated the search for the datastream. The streaming server which initiated the search replicates the datastream and stores the datastream therein. The streaming server will immediately provide the replicated datastream to the requesting media player client application and causes the replicated datastream to be available to other media player client applications.

DETAILED DESCRIPTION OF THE INVENTION

An application as used herein is an executable process comprising code or machine readable instruction for implementing predetermined functions including those of an operating system, healthcare information system or other information processing system, for example, in response user command or input. An executable procedure is a segment of code (machine readable instruction), sub-routine, or other distinct section of code or portion of an executable application for performing one or more particular processes and may include performing operations on received input parameters (or in response to received input parameters) and provide resulting output parameters. A processor as used herein is a device and/or set of machine-readable instructions for performing tasks. A processor comprises any one or combination of, hardware, firmware, and/or software. A processor acts upon information by manipulating, analyzing, modifying, converting or transmitting information for use by an executable procedure or an information device, and/or by routing the information to an output device. A processor may use or comprise the capabilities of a controller or microprocessor, for example. Multimedia content or content stream as used herein is any encoded or un-encoded data having at least one of video data and audio data. A media player application as used herein comprises an application that allows a user to at least one of request, select, manage, view, transmit, receive and playback audio, video or audio-video data thereon. A streaming server as used herein is a dedicated system for providing a continuous data stream (encoded or un-encoded) comprising at least one of video data and audio-video data for receipt by a client application on which the data stream is able to be further processed. A communication device as used herein is any device able to receive data signals to insure that the data contained in the received signal is at least one of routed, provided, delivered, switched and transmitted to a desired destination. An authorization server as used herein comprises any software application or hardware apparatus able to determine if a particular user has the right or permission to use a system resource. A multicast data stream as used herein comprises a continuous stream of data having at least one of video and audio-video data encoded therein originating from a single source that is transmitted and broadcast to members of a specified group or users or a specified system.

Figure 1:
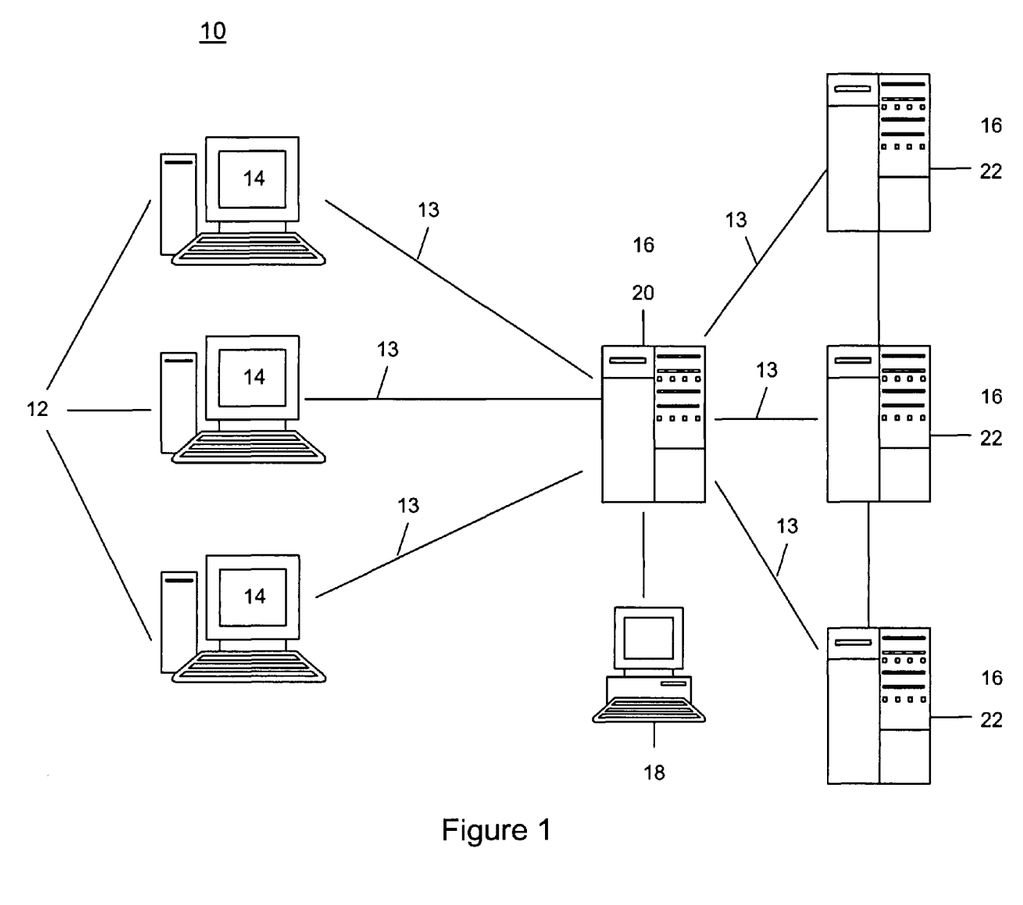
FIG. 1 is an illustrative view of the system according to invention principles.

FIG. 1 shows an exemplary system 10 according to invention principles. The system includes a plurality of users 12 each operating a media player application 14 which allows the users 12 to selectively request, receive and view multimedia datastreams thereon. The system 10 further includes at least one streaming server 16 having multimedia content stored thereon which is able to be made available in the form of a data stream to users 12 to be viewed using the media player application 14. The at least one streaming server 16 is one of a primary streaming servers 20 and peer server 22. The at least one streaming server 16 acts as a primary streaming server 20 to a plurality users 12 connected directly thereto. Thus, any additional streaming servers 16 connected to the primary streaming server 20 act as peer servers 22 to the plurality of users connected to the primary streaming server 20. The users 12 connected to the primary streaming server 20 are able to access any data stored on any of the peer servers 22 connected thereto. The system 10 further includes at least one administrator 18 connected to any of the at least one streaming servers 16 for controlling the operation of the streaming servers 16. Alternatively, the system 10 can include a plurality of administrators 18 connected in any manner to any of the respective streaming servers 16 of the system 10. The control functions performed by the administrator 18 will be discussed in more detail with respect to FIGS. 2-4. The users 12, streaming servers 16 and the administrator(s) 18 are interconnected via a communication network 13 such as a wide area network (WAN), local area network (LAN), the internet or any combination thereof. Furthermore, the connection between the members of the system may include both wired and wireless interconnection.

As will be discussed hereinafter, the system 10 of the present invention is able to insure the reliability of data transmission by dynamically negotiating data transmission modes available to be used between the users 12 and the streaming servers 16 when providing a multimedia data stream to the users in response to a request. The system 10 also insures the content requested by the users via the respective media player applications 14 is available to the users 12 by actively searching for the requested content on both the primary streaming server 20 and throughout a network of peer streaming servers 22. Upon a determination that the requested content is located on a respective peer streaming server 22, the content is replicated and stored by the primary streaming server 20 and to be made immediately available to the requested user as well as to other users connected to the primary streaming server 20.

Figure 2:
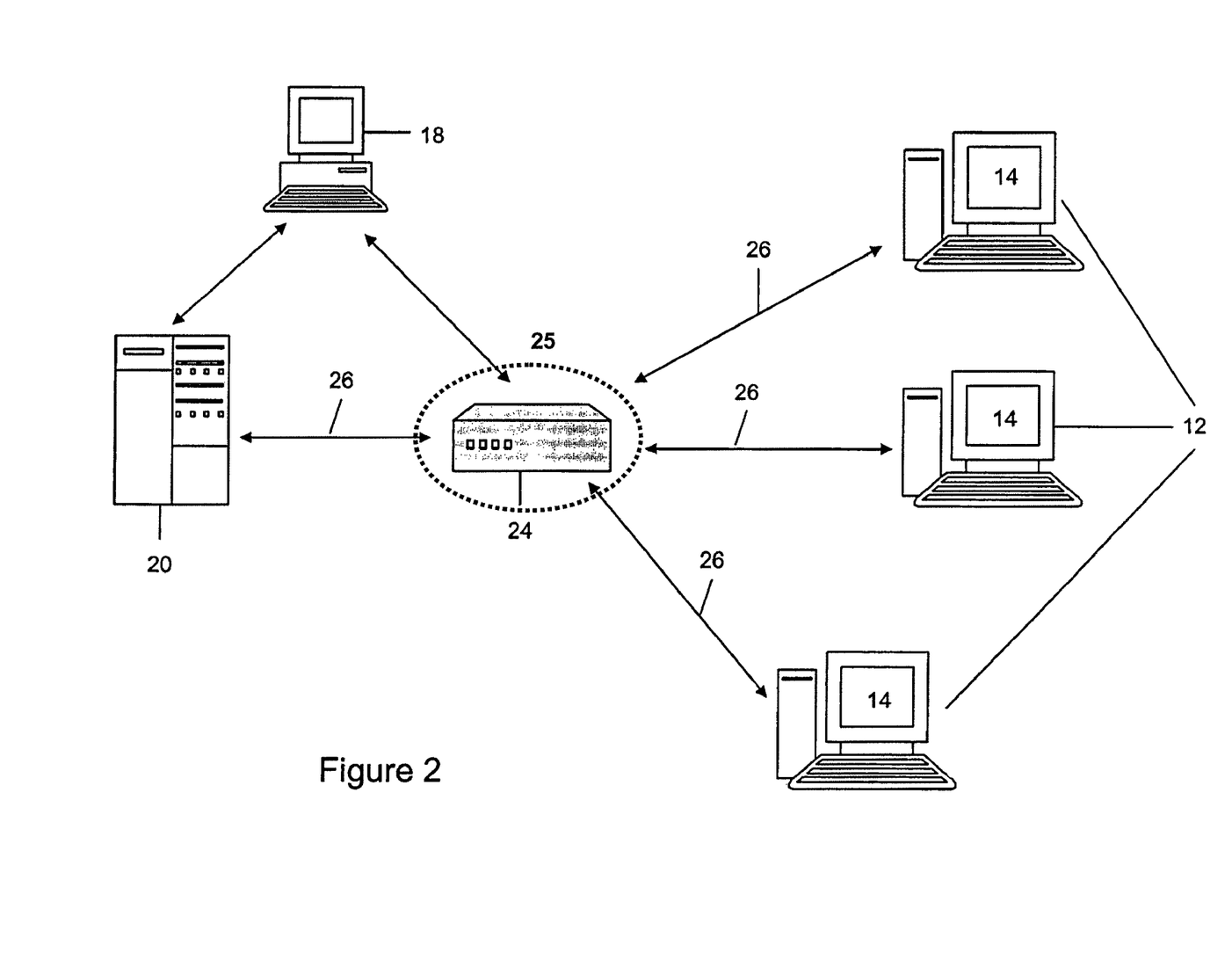
FIG. 2 is an illustrative view of the multicast transmission system according to invention principles.

FIG. 2 shows the system 10 in operation. The system 10 includes the plurality of users 12 at different locations employing media player applications 14 that are connected via an intervening network 25 including a communication device 24 to a primary streaming server 20. The primary streaming server 20 is administratively configurable by the administrator 18 to transmit a data stream in at least one of a unicast transmission mode and multicast transmission mode. The administrator 18 selectively determines which of the unicast and multicast transmission modes the primary server 20 transmits data to users 12. The administrator 18 may base the determination of transmission mode on a policy issue or based on a knowledge of the intervening network capabilities. Additionally, the administrator 18 determines a location on the primary server 20 and assigns an address to the determined location from which a multicast data transmission can at least one of originate and be accessed by each of the plurality of users 12. The media player applications 14 are also configured by the administrator to receive either a unicast data transmission, a multicast data transmission or both. The administrator 18 may also base the determination of transmission mode for each media player on a policy issue or based on a knowledge of the intervening network capabilities.

The system performs an empirical test on the intervening network to determine if the network can support the preferred multicast transmission mode or must fall back to a more conservative strategy or transmission mode. The empirical test allows administrators to configure a more aggressive transport strategy than is allowed with conventional networks. During the empirical test, the server sends out a multicast transmission stream to a group of users. Users within the group attempt to receive the content within the multicast transmission stream. If users within the group cannot receive the content within the multicast transmission stream, a failure for the transmission is recorded and a fall back to a unicast transmission stream is performed. If users within the group are unable to receive the multicast transmission stream, it is usually indicative that network elements such as routers, switches, firewalls, etc. are not multicast enabled. If the users are able to receive the content within the multicast transmission stream, the users then look for known features of the streaming format such as a 4 byte header, XML grouping information and other features of a transport layer protocol. A validation that information needed to decode the multicast stream at the transport layer is present is also performed. If these features are not found, a failure for the transmission is recorded and a fall back to a unicast transmission stream is performed. If these features are detected, a success is recorded and multicast transmission streaming begins.

At least one user 12 generates a request signal for a respective multimedia data stream using the media player application 14. The request signal is provided to the communication device 24 and further provided for receipt by the primary streaming server 20. The server then performs the empirical test on the network described above to determine if multicast transmission is possible. Upon determination the transmission mode, media player application 14 is able to receive a data transmission in the determined mode from the primary streaming server 20.

As shown in FIG. 2, the primary streaming server 20 and the media player applications 14 are communicating using a multicast data transmission mode 26. Mutlicasting requires a multicast session address to be either assigned by an administrator or generated by a server. The multicast session address corresponds to a location of requested data and forms a group to be accessed by a plurality of users 12. The multicast session address is either acquired by the media player applications 14, provided by the primary streaming server 20 to the users 12 or provided by the administrator 18 to one of the server and the users. Upon obtaining the multicast session address, each respective user may join the group whereby a single copy of the requested data stream 20 is provided by the primary streaming server 20 for receipt by the users 12.

Figure 3:
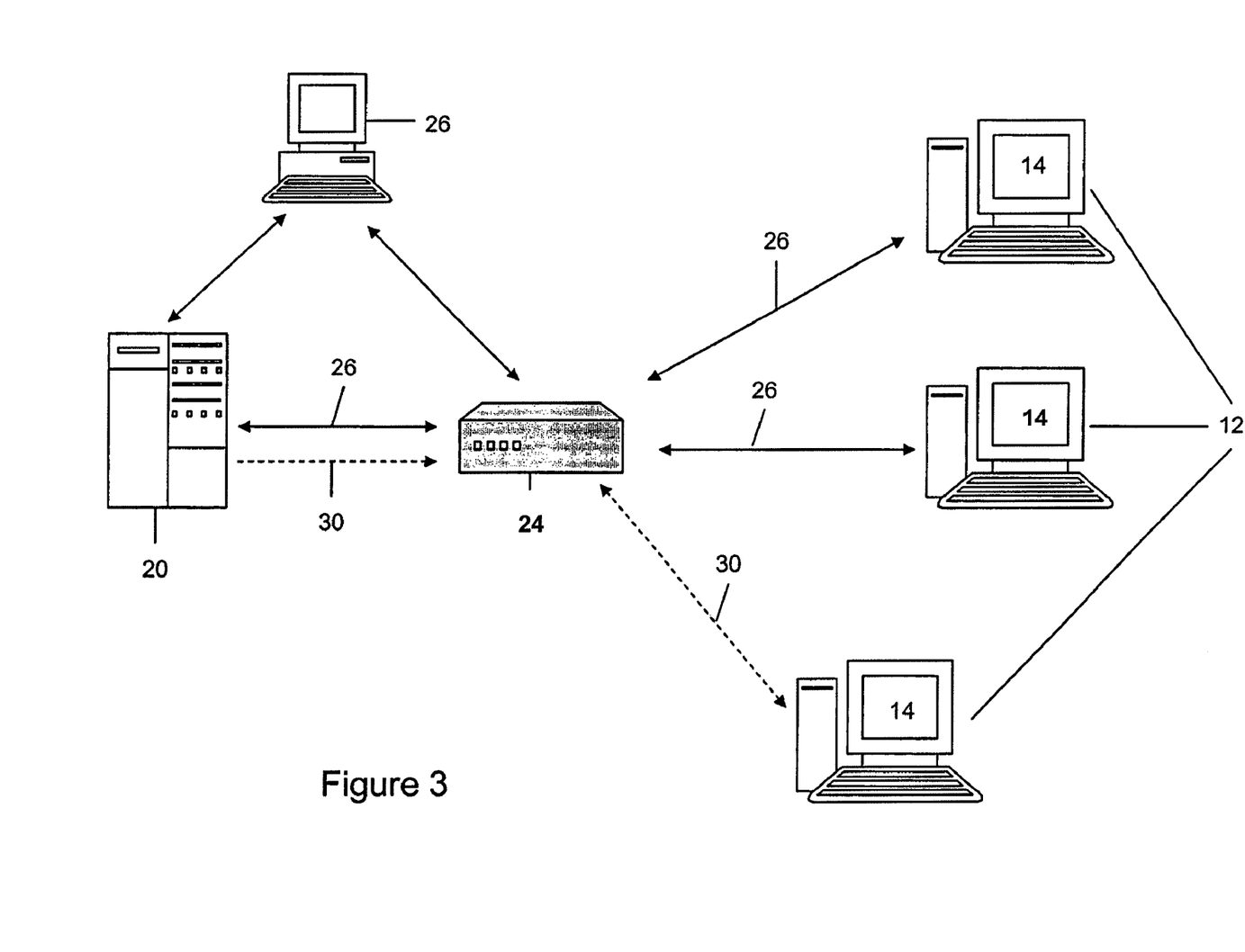
FIG. 3 is an illustrative view of the system negotiating data transmission modes between client applications according to invention principles.

FIG. 3 shows users 12 supporting different transmission modes for receiving a requested data stream from the primary streaming server 20. Shown herein are a plurality of users 12 running media player applications 14 and connected via the communication device 24 to the primary streaming server 20. Certain of the users 12 are able to support both a multicast and unicast data transmission mode and based upon the results of the empirical test, data transmission is provided using a multicast mode. Other of the users 12 are able to only support a multicast transmission mode. The users 12 able to support the requested data via a multicast transmission mode are indicated by the solid lines and arrows labeled with the reference numeral 26. Other users 12 are unable to support a multicast transmission mode and must receive the transmission using a unicast transmission mode, thus resulting in the primary streaming server transmitting the requested datastream in a unicast transmission mode as shown by the dash-line arrow labeled with the reference numeral 30. This determination is made in response to the empirical test discussed above. The system 10 is able to simultaneously provide the same requested content in a multicast transmission mode and a unicast transmission mode for receipt by a plurality of users 12, 28 based upon the ability of the intervening network and the individual users to support particular transmission modes.

Figure 4:
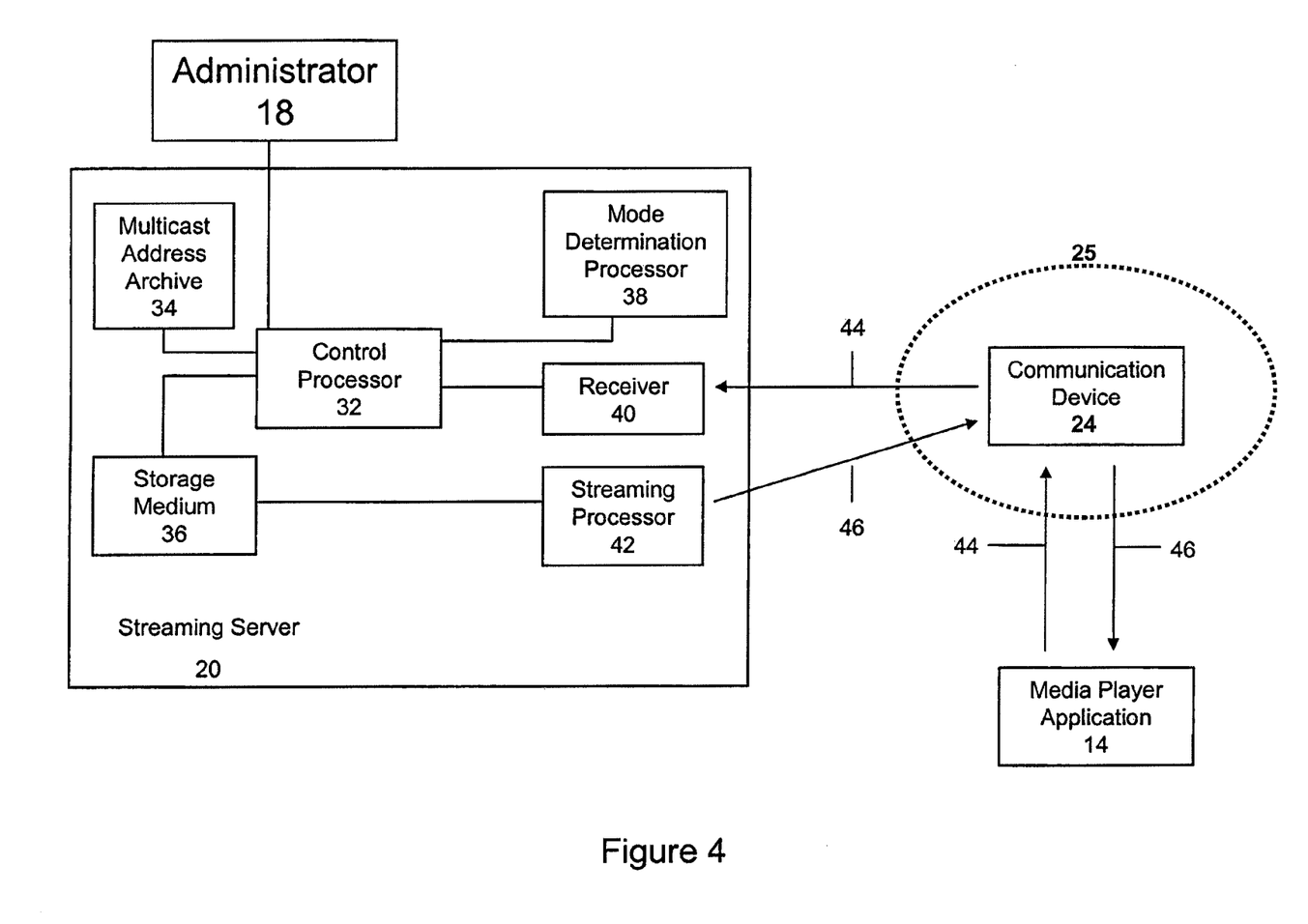
FIG. 4 is a block diagram of the streaming server according to invention principles.

FIG. 4 is a block diagram of the system 10. The system includes the primary streaming server 20, the media player application 14 and the intervening network 25. An administrator 18 provides instructions to a control processor 32 of the primary streaming server 20 for controlling operation thereof as well as configuring the server to support at least one of multicast and unicast transmission modes. Connected to the control processor 32 is a multicast address archive 34 for maintaining a plurality of addresses associated with a plurality of multicast transmission sessions as determined by the administrator 18. A storage medium 36 is further provided connected to the control processor 32 for storing at least one multimedia data stream therein. A mode determination processor 38 connected to the control processor 32 determines the supported data transmission mode of each respective user connected to the primary streaming server 20 and provides data to the control processor 32 representing the actual transmission mode for a respective user. A streaming processor 42 is connected to both the control processor 32 and the storage medium 36 for providing a requested data stream from the storage medium in the actual transmission mode as determined by the mode determination processor 38. The mode for transmission to each media player application 14 as well as the ability of the intervening network to support different transport modes is determined during the empirical test discussed above and the results are stored in the mode determination processor 38.

Figure 5:
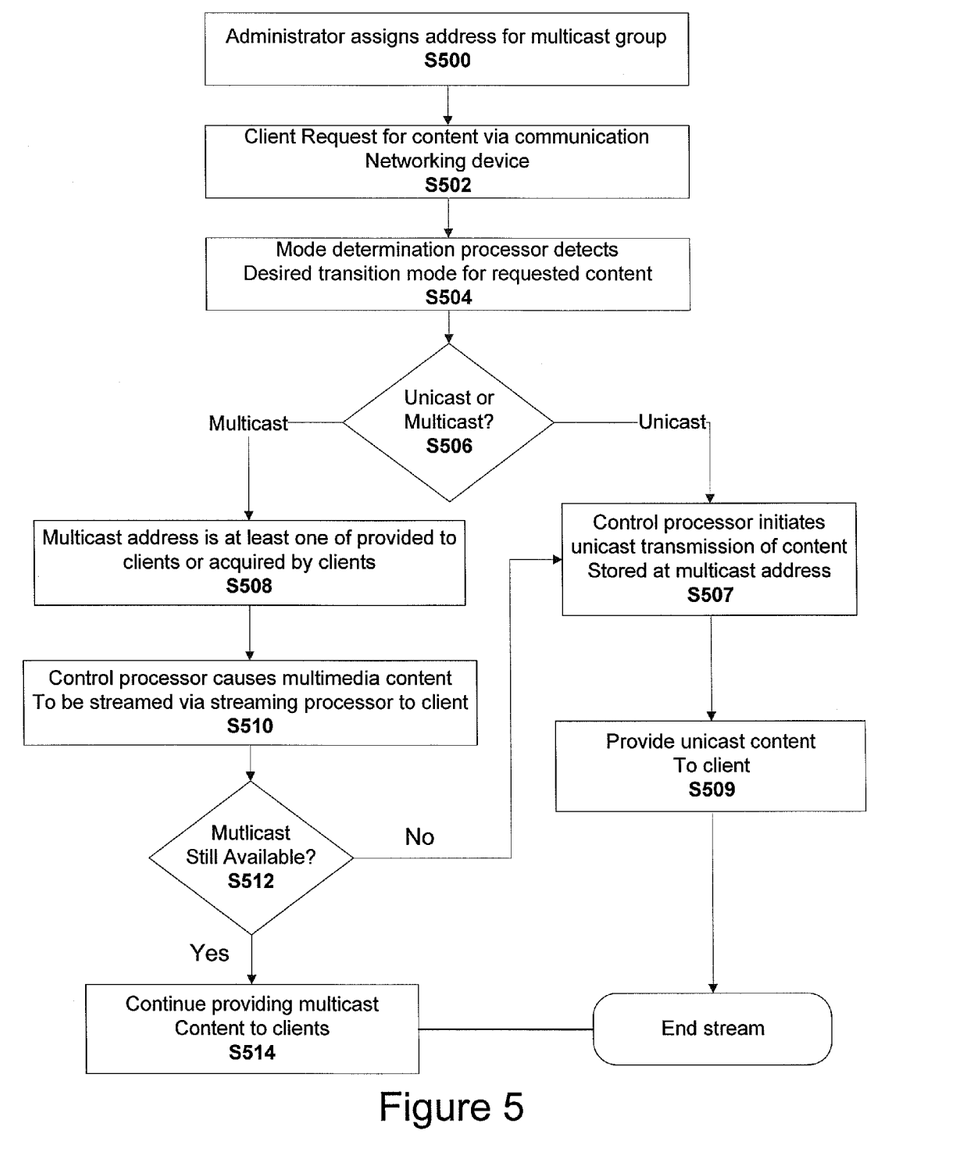
FIG. 5 is a flowchart detailing the operation of the streaming server as shown in FIG. 4 according to invention principles.

FIG. 5 is a flow diagram detailing the operation of the system 10 as shown in FIG. 4. In step S500, the administrator 18 assigns an address for a multicast group which is stored in the multicast address archive 34. The media player application generates a request signal 44 including the information discussed above and is provided via the communication device 24 for receipt by a receiver 40 of the primary streaming server 20 as in step S502. The server initiates an empirical test to determine the transmission mode supported by the intervening network and the group of media player applications by sending a multicast stream to the multicast group as described in step s504. The media player applications within the group attempt to receive content within the multicast stream sent by the server. A check is made to determine if the media player applications have received the content within the multicast stream as discussed in step S506. If a media player application cannot receive the content, a failure is recorded and a fall back to a unicast transmission mode is performed as stated in step S507. If the users are able to receive the content within the multicast transmission stream, the users then look for known features of the streaming format such as a 4 byte header, XML grouping information and other features of a transport layer protocol as described in step s510. A validation that information needed to decode the multicast stream at the transport layer is present is also performed. If these features are not found, a failure for the transmission is recorded and a fall back to a unicast transmission stream is performed as discussed in step S507. If these features are detected, a success is recorded and multicast transmission streaming begins as stated in step S512.

Figure 6:
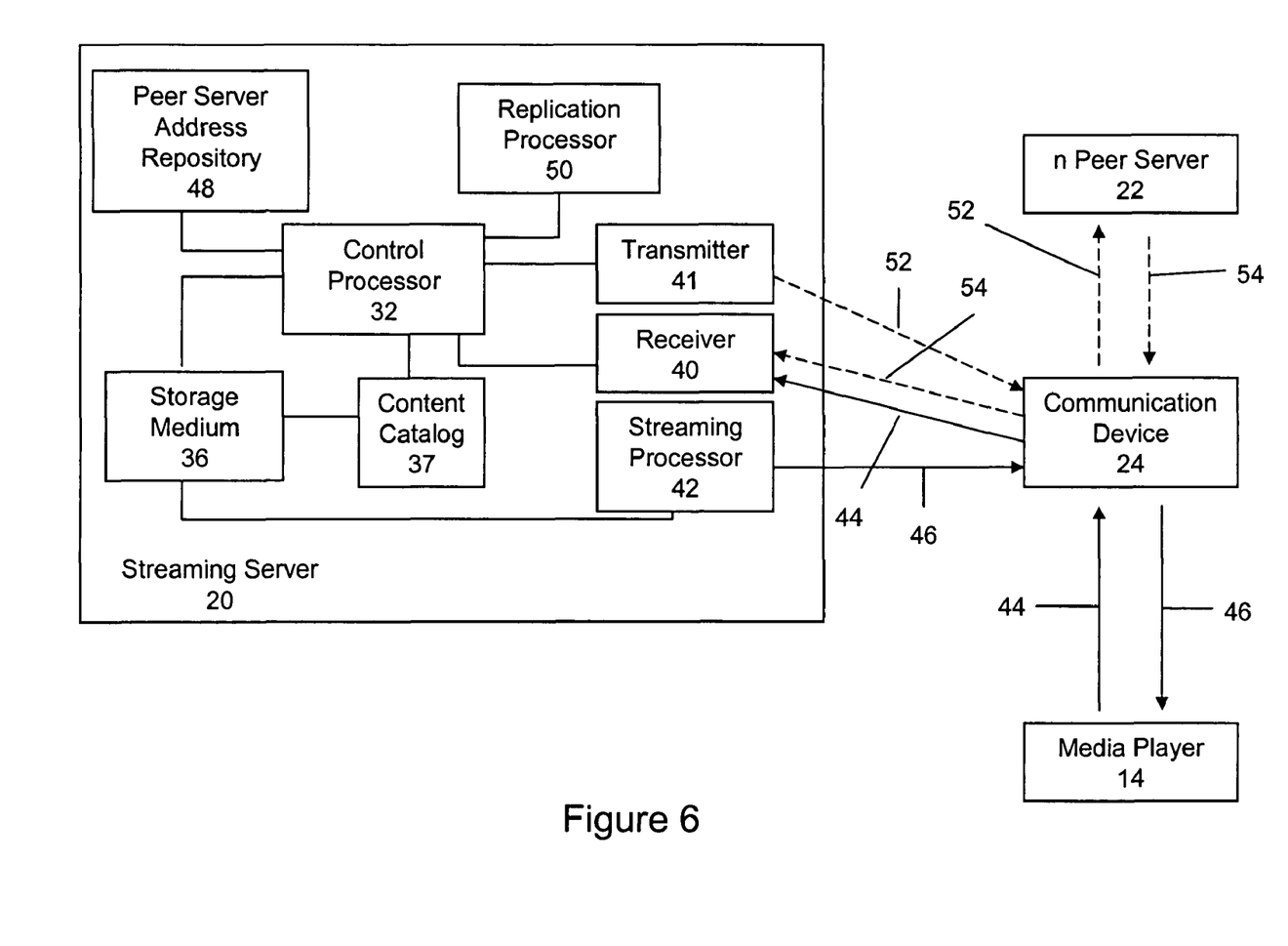
FIG. 6 is a block diagram of the streaming server according to invention principles.
Figure 7:
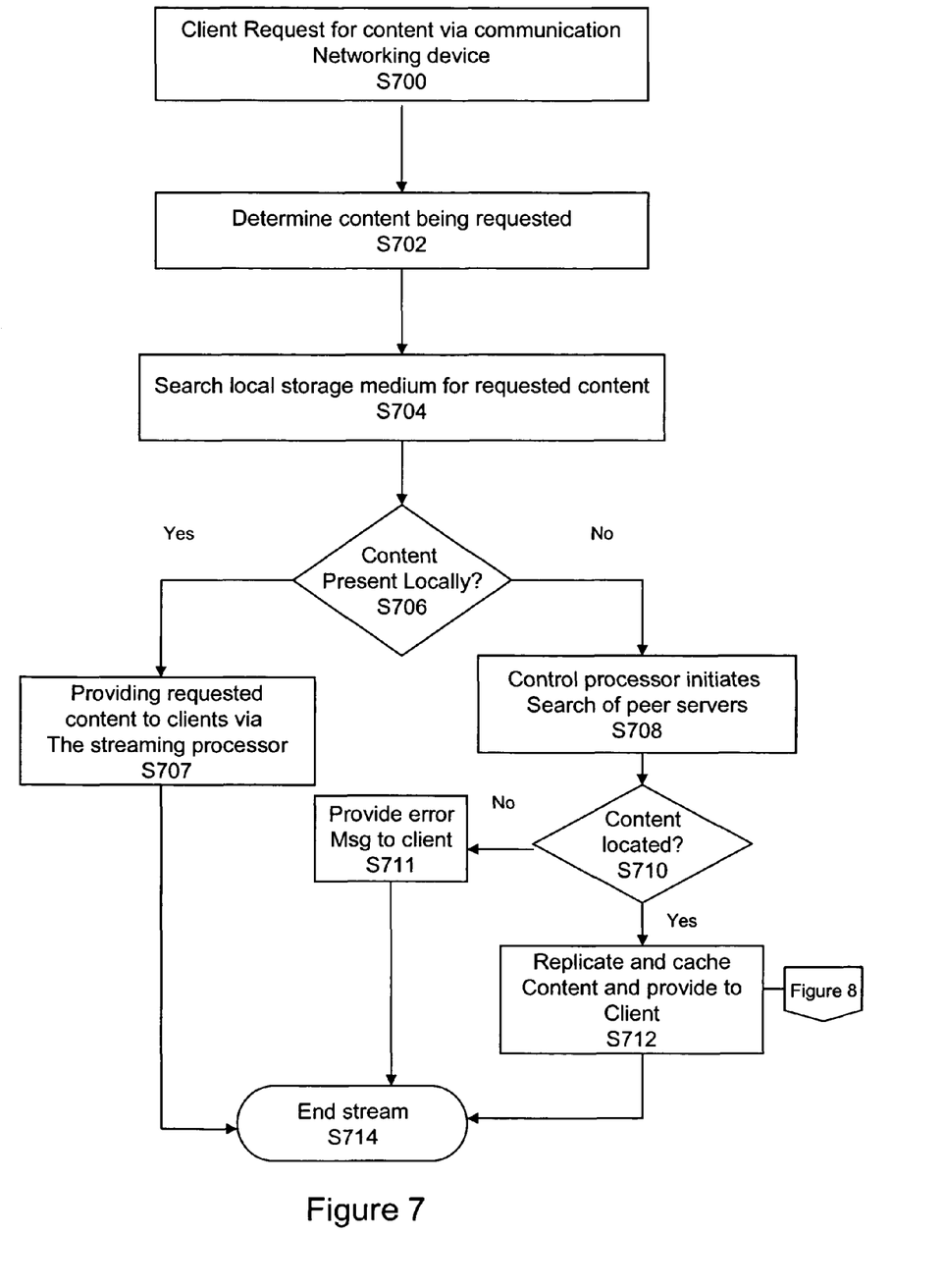
FIG. 7 is a flowchart detailing the operation of the streaming server as shown in FIG. 6 according to invention principles.

FIGS. 6 and 7 detail an expansion of the system 10. The system is further able to insure that multimedia content requested by users via media player applications that is not locally stored is immediately made available to the requesting user. As discussed in FIG. 1, the system 10 includes the plurality of clients connected directly with a primary streaming server 20 and further proving a plurality of peer servers 22 connected to the primary streaming server 20. When a respective media player application 14 requests a multimedia data stream, the primary streaming server 20 determines if the requested data stream is stored locally thereon. If not locally stored, then the primary streaming server initiates a search of the peer servers 22 for the requested data stream. Once located on a respective peer server 22, the primary streaming server retrieves the requested data stream, replicates the data stream and stores the data stream thereon. The requested data stream is then provided to the requesting media player application. Thus, subsequent requests for the same requested content received by the primary streaming server 20 are satisfied immediately. The replication of the data stream on the primary server eliminates the need for the primary server to search for the data across the costly and bandwidth intensive external network connecting the primary server and the peer servers allowing the requesting client application to retrieve the data stream immediately via the internal network which is less bandwidth intensive.

In the case of live stream replication, the entire data stream is replicated and propagated to a peer server where it is then available at a primary server via this proxied stream. The data stream proxied to the primary server is then provided for access by requesting media player applications. The primary server buffers the replicated and received data stream to allow for additional requesting clients to synch with and receive the data stream.

In the case of Video On Demand (VOD) replication, the entire data stream is replicated in its' entirety and "cached". Further, the content is available during the replication process. In this manner, the requesting client and any subsequent clients interested in the content do not have to wait for the caching operation to complete. Further, cached content is ranked by popularity. In the case where resources become scarce, more popular content is retained while less popular content is removed from the cache to satisfy current requests. The popularity of the content is prioritized based upon the number of requests for the content that are received.

FIG. 6 is a block diagram of the system 10 for locating and replicating requested data streams. The primary streaming server 20 is connected via at least one communication device 24 to at least one media player application 14 and a plurality of n peer servers 22, whereby "n" is any number greater than or equal to 1. Each of the n peer servers 22 includes all elements of the primary streaming server 20 and function in a similar manner as will hereinafter be described. Each server may act as a Primary server for a respective group of users connected directly thereto while acting as a peer server for a different group of users connected to a different server.

The primary streaming server 20 includes the elements discussed above in FIG. 4 and those elements operate in the same manner. The primary streaming server 20 further includes a peer server address repository 48 connected to the control processor for maintaining an address list corresponding to the plurality of n peer server 22 connected to the primary streaming server 20. A content catalog 37 is connected between the control processor and the storage medium and provides an accessible and editable list of multimedia content stored locally on the storage medium 36. A replication processor 50 is connected to the control processor 32 and actively replicates requested data streams located on a respective one of the peer servers 22.

FIG. 7 is a flow diagram detailing the operation of the system as shown above in FIG. 6. In step S700 a client requests a multimedia data stream via the media player application 14 which is received by the receiver 40 and provided to the control processor 32. The control processor 32 determines what data stream is being requested in step S702 and initiates a search via the content catalog 37 to determine if the requested data stream is stored locally on the primary streaming server 20 as in step S704. If the content is locally stored in the storage medium 36, the control processor 42 causes the requested content to be provided to the requesting user as shown in step S707 until the data stream ends as discussed in step S714. If the determination in step S706 is negative, then the control processor 32 utilizes the peer server address repository to acquire an address for the plurality of peer servers 22 connected thereto and further causes a search signal to be transmitted by a transmitter 41 for receipt by each respective peer server 22. Step S710 determines if the data stream is located on any of the peer servers 22. If the data stream is not located, then an error message is provided in step S711. If the content is located on a peer server, then the data stream is transmitted to the primary streaming server 20. The replication processor 50 causes the data stream to be replicated, stored in the storage medium 36 and simultaneously provided to the requesting user. The data stream is now stored on the primary streaming server 20 and directly accessible by any of the media player applications connected to the primary streaming server 20. The replication of the data stream readily provides the data stream to any media player applications within the LAN network inexpensively and requiring a small bandwidth while accessing the data stream between networks by connecting the primary server to the peer servers is more expensive and more bandwidth intensive.

Figure 8:
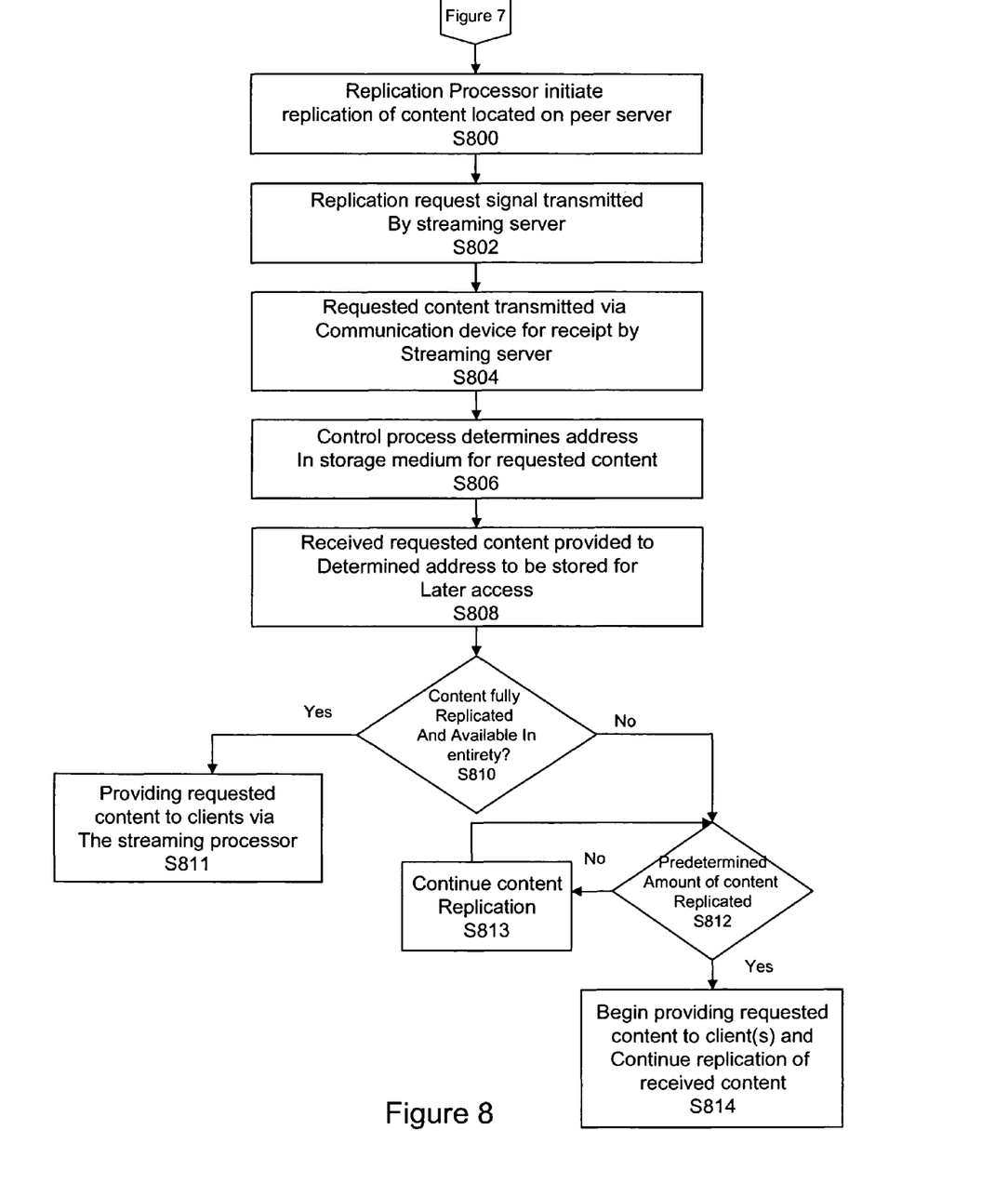
FIG. 8 is a flowchart detailing the operation of the streaming server as shown in FIG. 6 and continued on from FIG. 7 according to invention principles.

FIG. 8 is a flowchart continued on from FIG. 7. In step S800, the Replication Processor initiate replication of content located on the peer server. In step S802, the replication request signal is transmitted by the streaming server. In step S804, the requested content is transmitted via the communication device for a receipt by the streaming server. In step s806, the control process determines the address in the storage medium for the requested content. In step S808, the received requested content is provided to the determined address to be stored for later access. In step S810, it is determined whether the content is fully replicated and available in it's entirety. If it is determined true, the requested content is provided to the clients via the streaming processor in step S811. If it is determined that the content is not fully replicated and available in it's entirety, it is then determined whether a predetermined amount of content is replicated in step s812. If it is determined true, the providing of requested content to the client(s) begins and replication of the received content is continued in step S814. If it is determined false, the content replication is continued in step S813 and fed-back unto step s812.

What is claimed is:

1. A method for determining a transport mode comprising the activities of:
   transmitting a multicast stream by a server to a media player application, said multicast stream including multimedia data requested by a user and being used in determining a transport mode of a data stream able to be received by said media player application;
   checking said multicast stream by said media player application for features of a multicast streaming format to determine if said media player application can receive said multicast stream;
   automatically enabling a unicast transmission of a copy of said multimedia data requested by the user to the media player application during said activity of checking enabling said media player application to receive and begin displaying said requested data while determining if said media player application can receive said transmitted multicast stream;
   automatically enabling multicast processing of the transmitted multicast stream to the media player application and terminating said transmission of said unicast transmission of said multimedia data in response to detecting features of a multicast streaming format within said multicast stream by the media player application during said activity of checking.

2. The method of claim 1, further comprising the activities of:
   configuring, by an administrator, the server to support at least one of unicast and multicast transmission modes; and
   configuring, by an administrator, the media player application to support at least one of unicast and multicast transmission modes.

3. The method of claim 1, further comprising the activity of determining elements of an intervening network connecting the server and media player application are multicast enabled upon detecting features of the multicast streaming format by the media player application.

4. The method of claim 1, wherein the activity enabling the unicast transmission further includes the activity of recording a failure of the multicast stream.

5. The method of claim 1, wherein the activity of checking includes at least one of checking for an extensible markup language (XML) header, a 4 byte header and features of a transport layer protocol.

6. The method of claim 1, further comprising the activities of:
   in response to the automatic enabling of the unicast transmission, replicating by a transmitting server, the transmitted multicast stream; and
   storing the replicated multicast stream in a storage medium of an additional server.

7. A system for broadcasting an encoded data stream in one of a multicast and unicast transmission mode, said system comprising:
   a plurality of client systems including a media player application;
   a first server broadcasting a particular data stream to at least one of said plurality of client systems, said particular data stream including multimedia data requested by at least one client system and being used in determining a transport mode of a data stream able to be received by said client system, and being broadcast as
   a multicast formatted data stream including features of a multicast streaming format enabling the client system to determine if the client is able to receive said multicast formatted data stream; and,
   an intervening network connecting said first server to each of said plurality of client systems enabling transmission of said particular data stream from said first server to at least one of said plurality of clients, said first server, in response to a request from at least one of said plurality of clients,
      automatically initiating a broadcast of said particular data stream in a unicast transmission mode enabling said media player application to receive and begin displaying said particular data stream while said media player application is detecting features of a multicast streaming format within said multicast formatted particular encoded data stream and
      automatically enabling multicast processing of the particular encoded multicast formatted data stream by the media player application and terminating said broadcast of said particular data stream in said unicast transmission mode in response to said detection of multicast features within said particular encoded data stream.

8. The system of claim 7, wherein broadcasting of the encoded data stream between the first server and a respective one of said plurality of client systems is determined based upon whether the respective client system received the multicast data stream and detected the features of a streaming format.

9. The system of claim 7, wherein said first server is able to transmit in both the multicast transmission mode and the unicast transmission mode simultaneously to different ones of said plurality of client systems.

10. The system of claim 7, wherein said first server includes:
   a replication processor for replicating said multicast data stream in response to the automatic broadcasting of the encoded data stream being in the unicast transmission mode; and
   a storage medium for storing said replicated multicast data stream.

* * * * *